(12) United States Patent
Gauthier

(10) Patent No.: US 7,082,971 B2
(45) Date of Patent: Aug. 1, 2006

(54) AUTOMATIC LIQUID REFILL APPARATUS

(76) Inventor: Evan Gauthier, 8792 Maineville Rd., Maineville, OH (US) 45039

(*) Notice: Subject to any disclaimer, the term of this patent is extended or adjusted under 35 U.S.C. 154(b) by 188 days.

(21) Appl. No.: 10/710,829

(22) Filed: Aug. 5, 2004

(65) Prior Publication Data

US 2006/0027283 A1 Feb. 9, 2006

(51) Int. Cl.
*B65B 1/30* (2006.01)
(52) U.S. Cl. .................. 141/198; 141/192; 141/301; 141/309; 47/48.5; 119/72; 119/77
(58) Field of Classification Search .................. 141/18, 141/65, 192, 198, 301; 47/79, 40.5, 48.5; 119/51.5, 72, 77
See application file for complete search history.

(56) References Cited

U.S. PATENT DOCUMENTS

| 3,720,184 | A | * | 3/1973 | Pearce | ........................ | 119/51.5 |
|---|---|---|---|---|---|---|
| 4,993,176 | A | | 2/1991 | Spinosa | | |
| 5,009,028 | A | | 4/1991 | Lorenzana et al. | | |
| 5,054,236 | A | | 10/1991 | Sands | | |
| 5,157,868 | A | | 10/1992 | Munoz | | |
| 5,279,071 | A | | 1/1994 | McDougall | | |
| 5,636,592 | A | * | 6/1997 | Wechsler | .................... | 119/52.1 |
| 5,791,082 | A | | 8/1998 | Finello | | |
| 5,799,437 | A | | 9/1998 | Evans et al. | | |
| 5,809,934 | A | * | 9/1998 | Gavet | ........................ | 119/52.1 |
| 5,937,574 | A | | 8/1999 | Jacques | | |
| 6,079,361 | A | * | 6/2000 | Bowell et al. | ................. | 119/72 |
| 6,101,977 | A | | 8/2000 | Matz | | |

OTHER PUBLICATIONS

Steve Russell, The AquaFir Story, www.aquafir.com, [publication date unknown], Zebra Skimmers Corp., Cleveland, OH, USA.
Agriculture and AGR-Food Canada, Praire Farm Rehabilitation Administration, Water Conveyance with Syphons, Sep., 2000, PFRA-ARAP, Canada.

* cited by examiner

*Primary Examiner*—Timothy L. Maust
(74) *Attorney, Agent, or Firm*—Taft, Stettinius & Hollister LLP

(57) ABSTRACT

An apparatus for maintaining a liquid level within a receptacle such as a Christmas-tree stand water basin or a pet's water dish includes: a) a liquid reservoir adapted to be positioned above a height of a liquid holding basin of the receptacle, where the reservoir includes an open upper end and a lower end, where the open upper end includes a threaded, cylindrical outer surface and the lower end includes a reservoir outlet orifice; b) a cap including a cylindrical wall having an enclosed top end and an open bottom end, where the cylindrical wall includes a threaded inner surface from gauging with a threaded outer surface of the liquid reservoir; c) a valve assembly provided approximate the reservoir outlet orifice of the reservoir and operatively coupled to the cap to open the reservoir outlet orifice when the cap is threaded downwardly on the reservoir to a valve-open height below an actuating height an operative to close the reservoir outlet orifice when the cap is threaded upwardly to a valve-closed height on the reservoir above the actuating height; and d) a circumferential seal provided radially between the reservoir and the cap when the cap is threaded at least between the valve-open height and the valve-closed height.

17 Claims, 3 Drawing Sheets

AUTOMATIC LIQUID REFILL APPARATUS

BACKGROUND OF INVENTION

The present invention is directed to an automatic liquid refill apparatus for maintaining a liquid level within a receptacle such as a water basin in a Christmas tree stand or in a pet's water dish; and, more specifically a vacuum break automatic gravity flow liquid refill apparatus having relatively simple on/off actuation mechanism as well as the ability for the liquid storage/supply reservoir to be refilled without flooding the refill receptacle.

SUMMARY OF INVENTION

A first aspect of the present invention is directed to an apparatus for maintaining a liquid level within a receptacle that includes: a) a liquid reservoir adapted to be positioned above a height of a liquid holding basin of the receptacle, where the reservoir includes an open upper end and a lower end, where the open upper end includes a threaded, cylindrical outer surface and the lower end includes a reservoir outlet orifice; b) a cap including a cylindrical wall having an enclosed top end and an open bottom end, where the cylindrical wall includes a threaded inner surface from gauging with a threaded outer surface of the liquid reservoir; c) a valve assembly provided approximate the reservoir outlet orifice of the reservoir and operatively coupled to the cap to open the reservoir outlet orifice when the cap is threaded downwardly on the reservoir to a valve-open height below an actuating height an operative to close the reservoir outlet orifice when the cap is threaded upwardly to a valve-closed height on the reservoir above the actuating height; and d) a circumferential seal provided radially between the reservoir and the cap when the cap is threaded at least between the valve-open height and the valve-closed height. In a more detailed embodiment, the seal is an o-ring mounted about an outer circumferential surface of the reservoir below the threaded cylindrical outer surface of the reservoir. In a further detailed embodiment, the o-ring is seated within a circumferential groove extending radially inwardly into the outer circumferential surface of the reservoir, below the threaded cylindrical outer surface of the reservoir. In yet a further detailed embodiment, the valve assembly includes a ball-valve. In yet a further detailed embodiment, the ball-valve includes a ball positioned below the reservoir outlet orifice of the reservoir and is biased upwardly against the reservoir outlet orifice to close the reservoir outlet orifice, and includes an actuating structure operatively coupled between the cap and the ball, where the actuating structure overcomes the bias to push the ball away from the reservoir outlet orifice when the cap is threaded to the valve-open height. In yet a further detailed embodiment, the actuating structure includes a rod coupled to an upper end of the ball, extending upwardly through the reservoir outlet orifice and then into the reservoir. Alternatively, the actuating structure is not attached to the cap so that the cap may be removed from the reservoir, leaving the ball to be biased against the reservoir outlet orifice to thereby close the reservoir outlet orifice. Alternatively, the apparatus further includes e) a nozzle conduit position below the reservoir outlet orifice of the reservoir and contain the ball and bias means of the ball-valve therein, where the nozzle conduit has a nozzle outlet adapted to be in fluid communication with the receptacle.

In an alternative detailed embodiment of the first aspect of the present invention, the valve assembly includes a ball valve. In a further detailed embodiment, the ball valve includes a ball positioned below the reservoir outlet orifice of the reservoir and is biased upwardly against the reservoir outlet orifice to close the reservoir outlet orifice, and includes an actuating structure operatively coupled between the cap and the ball, where the actuating structure overcomes the bias to push the ball away from the reservoir outlet orifice when the cap is threaded to the valve-open height. In a more detailed embodiment, the actuating structure includes a rod coupled to an upper end of the ball, extending upwardly through the reservoir outlet orifice and into the reservoir. Alternatively, the actuating structure is not attached to the cap so that the cap may be removed from the reservoir leaving the ball to be biased against the reservoir outlet orifice to close the reservoir outlet orifice. Alternatively, the apparatus further includes e) a nozzle conduit positioned below the reservoir outlet orifice of the reservoir and containing the ball and bias mechanism of the ball-valve therein, where the nozzle conduit has a nozzle outlet adapted to be in fluid communication with the receptacle. In this alternative detailed embodiment, the apparatus may further include f) a hose extending from the nozzle conduit at a first open end and adapted to be extended into the receptacle at an opposing end.

In yet a further alternative detailed embodiment of the first aspect of the present invention, the valve assembly is operative to maintain the reservoir outlet orifice closed when the cap is threaded upwardly beyond the valve-closed height and removed from the reservoir.

It is a second aspect of the present invention to provide an apparatus for maintaining a liquid level within a receptacle that includes a) a liquid reservoir adapted to be positioned above a height of a liquid-holding basin of the receptacle, where the reservoir includes an open upper end and a lower end, where the open upper end includes an outer surface and the lower end includes a reservoir outlet orifice; b) a cap including an outer wall having an enclosed top end and an open bottom end, where the outer wall is shaped to engage with the outer surface of the liquid reservoir; c) a valve assembly provided approximate the reservoir outlet orifice of the reservoir and operatively coupled to the cap to open the reservoir outlet orifice when the cap is moved downwardly on the reservoir to a valve-open height below an actuating height and operative to close the reservoir outlet orifice when the cap is moved upwardly to a valve-closed height on a reservoir above the actuating height; and d) a peripheral seal provided between the outer surface of the reservoir and an inner surface of the outer wall of the cap when the cap is moved at least between the valve-open height and the valve-closed height.

DETAILED DESCRIPTION

The present invention is directed to an automatic liquid refill apparatus for maintaining a liquid level within a receptacle such as a water basin in a Christmas tree stand or in a pet's water dish; and, more specifically a vacuum break automatic gravity flow liquid refill apparatus having relatively simple on/off actuation mechanism as well as the ability for the liquid storage/supply reservoir to be refilled without flooding the refill receptacle.

Figure 1:
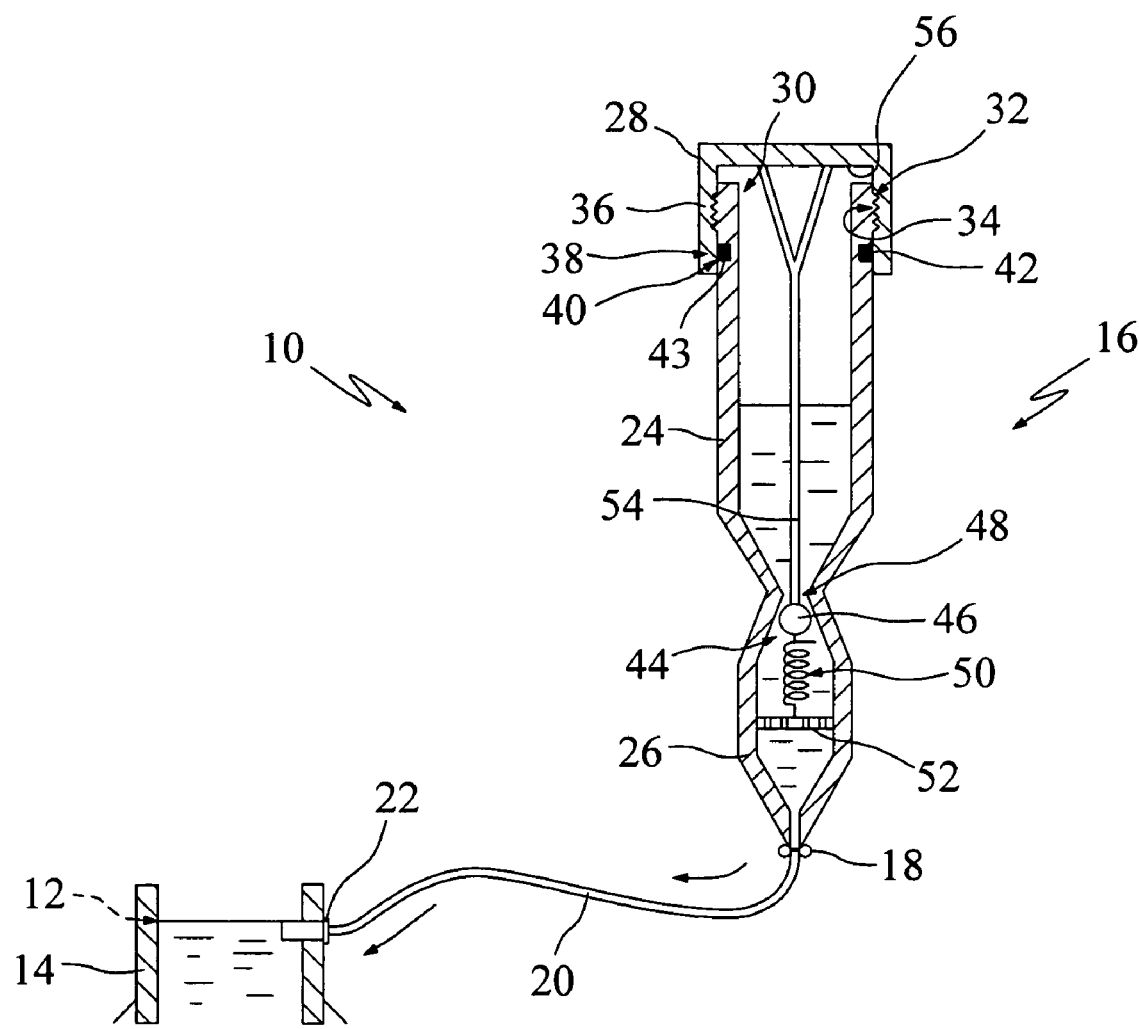
FIG. 1 is a schematic/cross-sectional depiction of an exemplary embodiment of the present invention illustrating the liquid-holding reservoir assembly in a nozzle-valve open configuration.

As shown in FIG. 1, an exemplary embodiment of an automatic liquid refill apparatus 10 according to the present invention for maintaining a liquid level 12 in a refill receptacle 14, such as a water basin in a Christmas tree stand or in a pet's water dish, includes a liquid-holding reservoir assembly 16 positioned at a height above the desired water level 12 of the refill receptacle 14, where the liquid-holding reservoir assembly 16 includes an outlet nozzle 18 having a hose 20 extending therefrom for being coupled in an inlet port 22 of the refill receptacle 14. The liquid-holding reservoir assembly includes a substantially cylindrical primary reservoir 24 and a substantially cylindrical nozzle conduit 26 positioned below the primary reservoir and in fluid communication with the primary reservoir, and a reservoir cap 28 threaded onto the upper open end 30 of the primary reservoir 24.

The open upper end 30 of the primary reservoir 24 includes threads 32 on the outer circumferential surface thereof for engaging with corresponding threads 34 on the inner circumferential surface under the reservoir cap 28. The cylindrical wall 36 of the reservoir cap has a portion 38 extending below the threads 34 having an inner surface that is adapted to engage with a circumferential seal 40 provided on the outer circumferential surface of the primary reservoir 24 below the threads 32 of the primary reservoir. The circumferential seal 40 includes an o-ring 42 received within an annular notch 43 extending radially into the outer circumferential surface of the primary reservoir 24.

The nozzle conduit 26 extending below the primary reservoir 24 includes a ball-valve assembly 44 mounted therein, where the ball-valve assembly 44 includes a ball-valve 46 biased towards an outlet orifice 48 of the primary reservoir 24 by a spring 50, which is mounted between a base 52 and the ball valve 46 within the nozzle conduit 26. The base 52 includes axial channels to allow the liquid to pass thereby. The ball valve assembly 44 also includes an actuating rod 54 coupled to, and extending from the ball valve 46 upwardly through the outlet orifice 48 of the primary reservoir and abutting against (but not necessarily coupled to) the top inner surface 56 of the reservoir cap 28 when the reservoir cap is threaded onto the open upper end 30 of the primary reservoir 24.

As shown in FIG. 1, the reservoir cap 28 is threaded downwardly onto the open upper end 30 of the primary reservoir 24 so that the inner top surface 56 of the reservoir cap 28 pushes downwardly on the actuator rod 54 of the ball valve assembly 44, which in turn, pushes downwardly on the ball valve 46 of the ball valve assembly 44, overcoming the bias induced by the spring 50, to thereby open the outlet orifice 48 of the primary reservoir and to allow fluid communication between the primary reservoir 24, the nozzle conduit 26, the hose 20 and the refill receptacle 14. In this valve-open configuration, the liquid-holding reservoir assembly 16 operates as a vacuum break, gravity regulated liquid delivery system. Such vacuum break systems require that the source reservoir (i.e., the primary reservoir 24 in the present embodiment) be substantially airtight. In the present embodiment, the circumferential seal 40 provided radially between the cylindrical wall 36 of the reservoir cap 28 and the outer circumferential surface of the primary reservoir 24 provides this substantial airtight seal. A partial vacuum develops in the primary reservoir 24 which stops the flow of water through the liquid-holding reservoir assembly 16 and into the liquid receptacle 14 until the liquid level 12 within the liquid receptacle 14 drops below the level of the inlet port 22, which allows air to enter into the inlet port 22. This allowance of air into the inlet port 22 and reservoir assembly 16 relieves the partial vacuum within the reservoir assembly 16 and allows the liquid to flow downwardly through the reservoir assembly 16 and back into the refill receptacle 14 until the level of liquid within the refill receptacle 14 reaches above the level of the inlet port 22 again. This automatic refill process will proceed continuously until the liquid-holding reservoir assembly 16 is emptied or until the ball valve assembly 44 is moved to a closed position, as described below.

Figure 2:
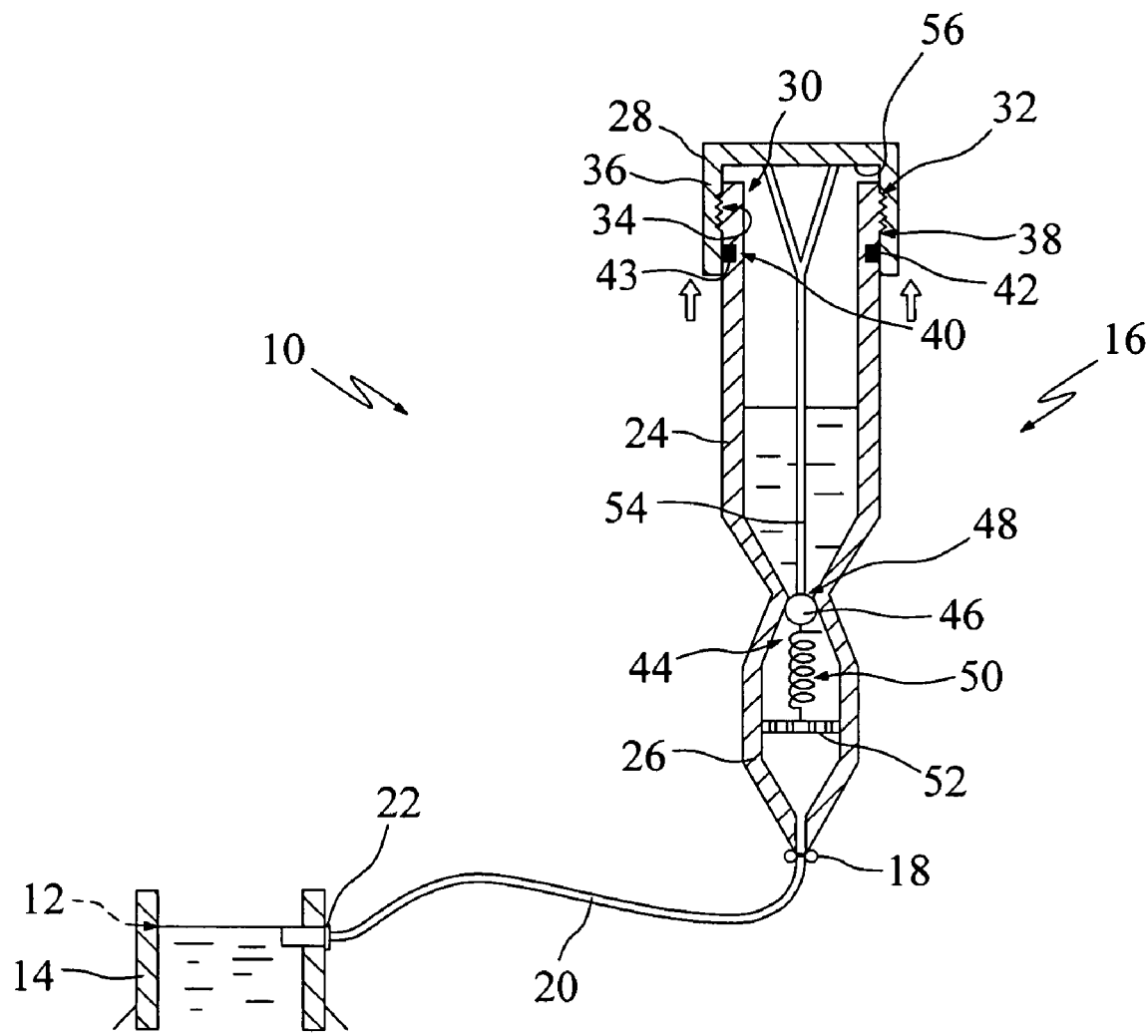
FIG. 2 illustrates the exemplary embodiment of FIG. 1 where the liquid-holding reservoir assembly is in a nozzle-valve closed configuration.

As shown in FIG. 2, the reservoir cap 28 has been threaded counter-clockwise so that it lifts upwardly with respect to the primary reservoir 24, which in turn allows the actuating rod to be pushed upwardly by the spring 50 until the ball valve is pressed against the outlet orifice 48 of the primary reservoir 24, thereby closing the outlet orifice 48. In the present embodiment, as can be seen in FIG. 2, the portion 38 of the outer cylindrical wall 36 of the reservoir cap 28 extending below the threads 34 is still engaged with the circumferential seal 40 so that the partial vacuum provided within the liquid-holding reservoir assembly 16 still exists when the liquid-holding reservoir assembly is configured to the valve-closed configuration as shown in FIG. 2. In this configuration, the automatic refill operation of the apparatus 10 will cease until the valve assembly 44 is opened again.

Figure 3:
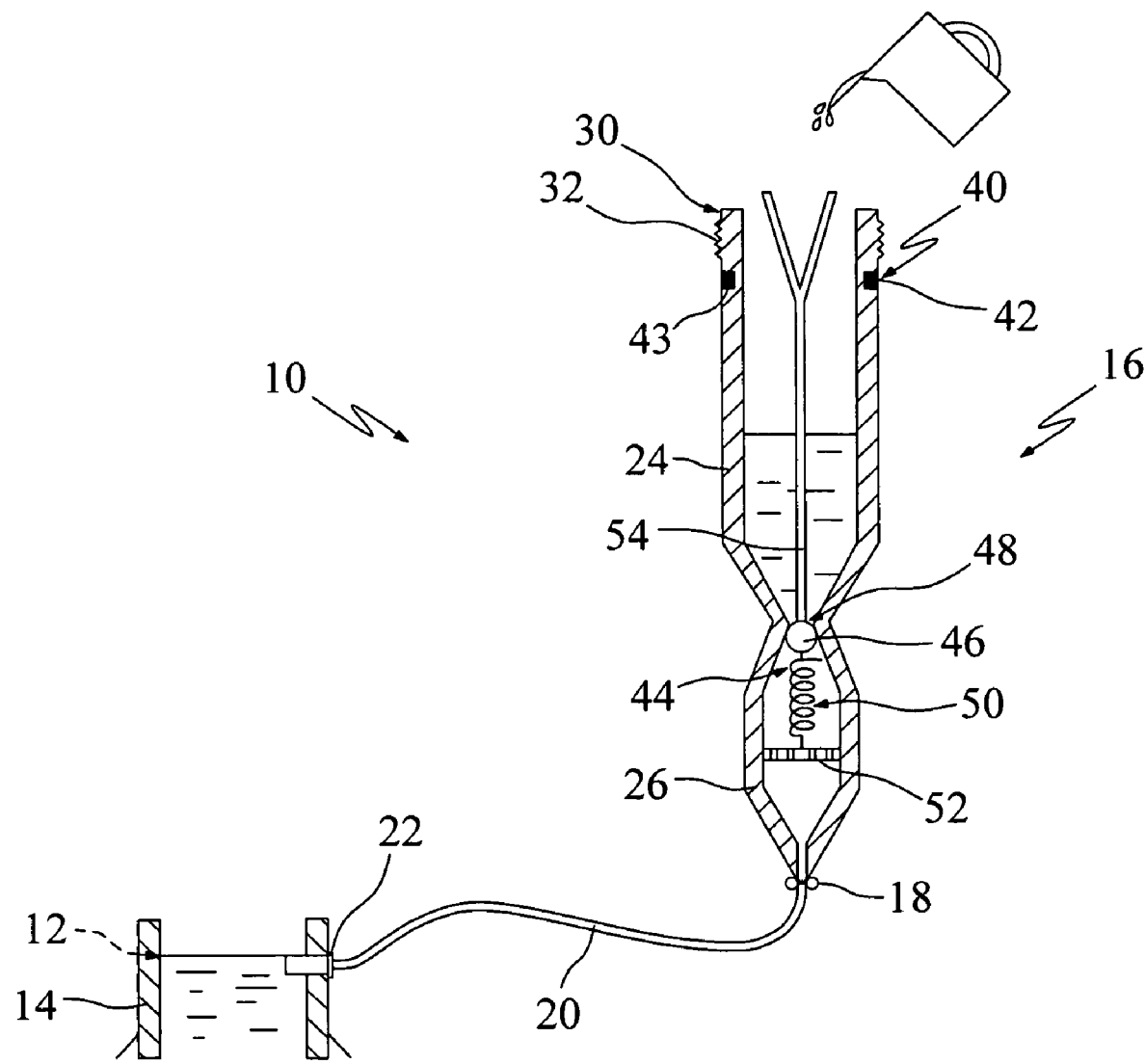
FIG. 3 illustrates the exemplary embodiment of FIGS. 1 and 2 in which the liquid-holding reservoir assembly is in the nozzle-valve closed configuration with the reservoir cap removed to allow refill of the liquid-holding reservoir.

As shown in FIG. 3, further counter-clockwise threading of the reservoir cap 28 will allow the reservoir cap 28 to be removed from the open upper end 30 of the primary reservoir 24. Because the ball valve 46 is still biased against the outlet orifice 48 by the spring 50 of the ball valve assembly 44, the ball valve assembly 44 will still be closed when the reservoir cap 28 is removed. This allows the primary reservoir 24 to be refilled or capped off without risking flooding into the refill receptacle 14.

Selection of the dimensions and other configurations for the exemplary embodiment are based upon reference to "Water Conveyance with Siphons", September 2000, Canadian Prairie Farm Rehabilitation Administration, Agriculture and Agri-Food, Canada, the disclosure of which is incorporated herein by reference.

Based upon the above description, it can be seen that the exemplary embodiment allows the valve assembly of the liquid-holding reservoir assembly to the opened and closed by mere movement of the reservoir cap 28 up and down on the open upper end 30 of the primary reservoir 24, while maintaining a circumferential seal between the reservoir cap 28 and the primary reservoir 24 during this movement. Additionally, the cooperation between the reservoir cap and the valve assembly assures that the valve assembly is closed when the reservoir cap is removed, thereby allowing refill or capping-off of the primary reservoir 24 without risking flooding into the refill receptacle 14.

Following from the above description and invention summaries, it should be apparent to those of ordinary skill in the art that, while the apparatuses herein described and illustrated constitute exemplary embodiments of the present invention, it is understood that the inventions are not limited to these precise embodiments and that changes may be made therein without departing from the scope of the inventions as defined by the claims. For example, and without limitation, it is not necessary that the valve assembly described herein be a ball-valve assembly and it is also not necessary that the operative coupling between the reservoir cap and the ball-valve assembly be an actuating rod. Furthermore, and without limitation, it is not necessary that the reservoir cap be threaded onto the primary reservoir. Additionally, it is to be understood that the inventions are defined by the claims and it is not intended that any limitations or elements describing the exemplary embodiments set forth herein are to be incorporated into the meanings of the claims unless explicitly recited in the claims themselves. Likewise, it is to be understood that it is not necessary to meet any or all of the recited advantages or objects of the inventions disclosed herein in order to fall within the scope of any claim, since the inventions are defined by the claims and since inherent and/or unforeseen advantages of the present inventions may exist even though they may not have been explicitly discussed herein.

What is claimed is:

1. An apparatus for maintaining a liquid level within a receptacle comprising:
   a liquid reservoir adapted to be positioned above a height of a liquid holding basin of the receptacle, the reservoir including an open upper end and a lower end, the open upper end including a threaded, cylindrical outer surface, and the lower end including an reservoir outlet orifice;
   a cap including an cylindrical wall having an enclosed top end and an open bottom end, the cylindrical wall including a threaded inner surface for engaging with the threaded outer surface of the liquid reservoir;
   a valve assembly provided approximate the reservoir outlet orifice of the reservoir and operatively coupled to the cap to open the reservoir outlet orifice when the cap is threaded downwardly on the reservoir to a valve-open height below an actuating height and operative to close the reservoir outlet orifice when the cap is threaded upwardly to a valve-closed height on the reservoir above the actuating height; and
   a circumferential seal provided radially between the reservoir and the cap when the cap is threaded at least between the valve-open height and the valve-closed height.

2. The apparatus of claim 1, wherein the seal is an o-ring mounted about an outer circumferential surface of the reservoir below the threaded cylindrical outer surface of the reservoir.

3. The apparatus of claim 2, wherein the o-ring is seated within a circumferential groove extending radially inwardly into the outer circumferential surface of the reservoir below the threaded cylindrical outer surface of the reservoir.

4. The apparatus of claim 3, wherein the valve assembly includes a ball-valve.

5. The apparatus of claim 4, wherein the ball-valve includes:
   a ball positioned below the reservoir outlet orifice of the reservoir and is biased upwardly against the reservoir outlet orifice to close the reservoir outlet orifice; and
   an actuating structure operatively coupled between the cap and the ball, the actuating structure overcoming the bias to push the ball away from the reservoir outlet orifice when the cap is threaded to the valve-open height.

6. The apparatus of claim 5, wherein the actuating structure includes a rod coupled to an upper end of the ball, extending upwardly through the reservoir outlet orifice and into the reservoir.

7. The apparatus of claim 5, wherein the actuating structure is not attached to the cap so that the cap may be removed from the reservoir leaving the ball to be biased against the reservoir outlet orifice to close the reservoir outlet orifice.

8. The apparatus of claim 5, further comprising a nozzle conduit positioned below the reservoir outlet orifice of the reservoir and containing the ball and bias of the ball-valve therein, the nozzle conduit having a nozzle outlet adapted to be in fluid communication with the receptacle.

9. The apparatus of claim 8, further comprising a hose extending from the nozzle conduit at a first open end and adapted to be extended into the receptacle at an opposing open end.

10. The apparatus of claim 1, wherein the valve assembly includes a ball-valve.

11. The apparatus of claim 10, wherein the ball-valve includes:
    a ball positioned below the reservoir outlet orifice of the reservoir and is biased upwardly against the reservoir outlet orifice to close the reservoir outlet orifice; and
    an actuating structure operatively coupled between the cap and the ball, the actuating structure overcoming the bias to push the ball away from the reservoir outlet orifice when the cap is threaded to the valve-open height.

12. The apparatus of claim 11, wherein the actuating structure includes a rod coupled to an upper end of the ball, extending upwardly through the reservoir outlet orifice and into the reservoir.

13. The apparatus of claim 11, wherein the actuating structure is not attached to the cap so that the cap may be removed from the reservoir leaving the ball to be biased against the reservoir outlet orifice to close the reservoir outlet orifice.

14. The apparatus of claim 11, further comprising a nozzle conduit positioned below the reservoir outlet orifice of the reservoir and containing the ball and bias of the ball-valve therein, the nozzle conduit having a nozzle outlet adapted to be in fluid communication with the receptacle.

15. The apparatus of claim 14, further comprising a hose extending from the nozzle conduit at a first open end and adapted to be extended into the receptacle at an opposing open end.

16. The apparatus of claim 1, wherein the valve assembly is operative to maintain the reservoir outlet orifice closed when the cap is threaded upwardly beyond the valve-closed height and removed from the reservoir.

17. An apparatus for maintaining a liquid level within a receptacle comprising:
    a liquid reservoir adapted to be positioned above a height of a liquid holding basin of the receptacle, the reservoir including an open upper end and a lower end, the open upper end including an outer surface, and the lower end including an reservoir outlet orifice;
    a cap including an outer wall having an enclosed top end and an open bottom end, the outer wall shaped to engage with the outer surface of the liquid reservoir;
    a valve assembly provided approximate the reservoir outlet orifice of the reservoir and operatively coupled to the cap to open the reservoir outlet orifice when the cap is moved downwardly on the reservoir to a valve-open height below an actuating height and operative to close the reservoir outlet orifice when the cap is moved upwardly to a valve-closed height on the reservoir above the actuating height; and a peripheral seal provided between the outer surface of the reservoir and an inner surface of the outer wall of the cap when the cap is moved at least between the valve-open height and the valve-closed height.

* * * * *